Sept. 4, 1934.  T. H. DRUMMOND  1,972,762
FLY CATCHER
Filed Oct. 10, 1933
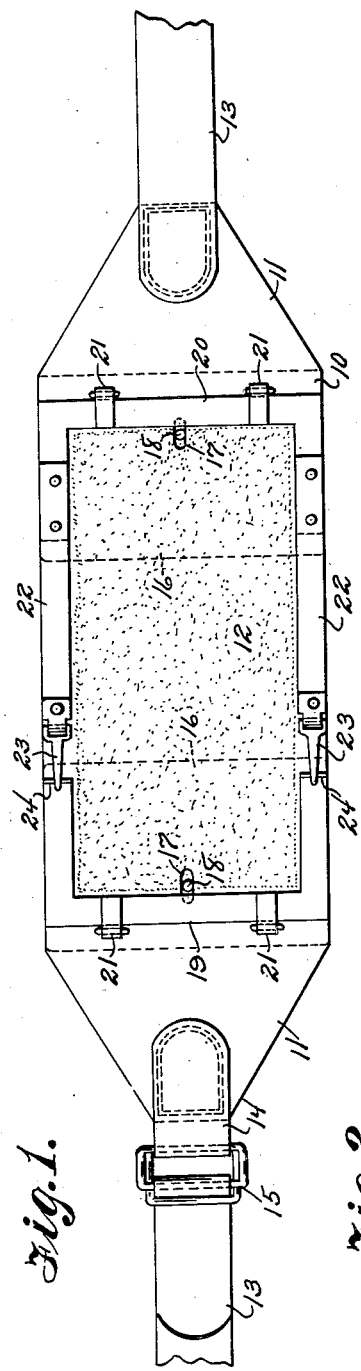
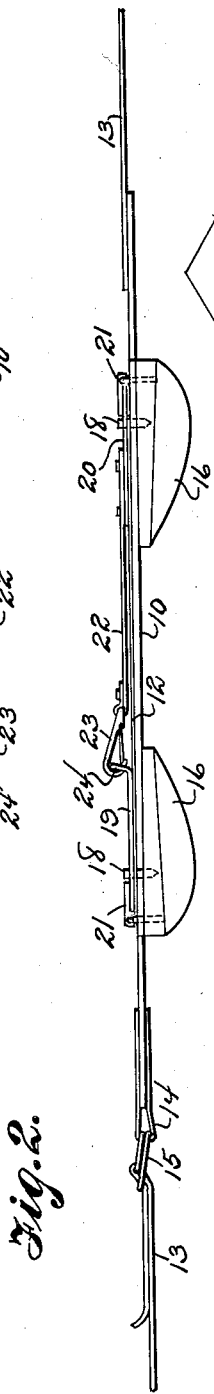
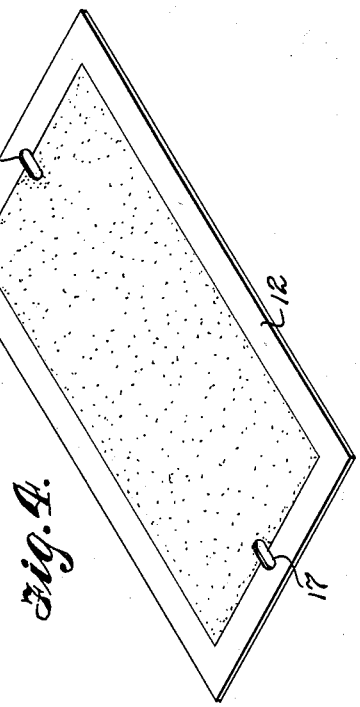
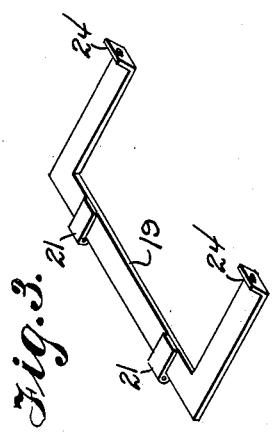
Thomas H. Drummond
INVENTOR
BY Victor J. Evans & Co.
ATTORNEY Patented Sept. 4, 1934

1,972,762

UNITED STATES PATENT OFFICE 1,972,762

FLY CATCHER

Thomas H. Drummond, Sandidges, Va.

Application October 10, 1933, Serial No. 693,028

1 Claim. (Cl. 43—115)

The invention relates to a fly catcher adaptable for use on animals, particularly cattle.

The primary object of the invention is the provision of a catcher of this character, wherein a sheet of fly paper having a sticky composition can be held in a manner upon the body of an animal for the catching and destroying of flies that affect cattle, especially the horn flies that infest all sections during the warm season and prey upon the cattle in swarms, sucking the blood and giving annoyance both day and night.

Another object of the invention is the provision of a catcher of this character, wherein the fly paper is supported in a novel manner and can be held across the shoulders of an animal for the purpose of catching and destroying flies, the holder being of a construction so that adjustment may be made for the fitting thereof to different sizes of animals and will be maintained in place when in use without annoyance or discomfort to the animal wearing the same.

A further object of the invention is the provision of a catcher of this character which is extremely simple in construction, reliable and effective in its purpose, readily and easily applied to and removed from an animal, strong, durable, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claim hereunto appended.

In the accompanying drawing:

Figure 1 is a fragmentary plan view of a device constructed in accordance with the invention, showing the sticky fly paper held in place for the wearing thereof by an animal.

Figure 2 is a side edge view of the device.

Figure 3 is a detail perspective view of one of the clamps for the paper.

Figure 4 is a perspective view of the fly paper removed from the device.

Similar reference characters indicate corresponding parts throughout the several views in the drawing.

Referring to the drawing in detail, the fly catcher comprises a body 10 having the reversely outwardly tapered end portions 11 and this body constitutes a holder for a piece of sticky fly paper 12 of the ordinary well known kind for the catching of flies.

Secured to the end portions 11 are the girth straps 13 and 14, respectively, the latter carrying a buckle 15 for the adjustment of the straps 13 therein to permit the fitting of the holder upon the body of an animal. The body constitutes a saddle to be worn upon the back of the animal just beyond the shoulder and at the underside of this body 10 are the spaced pads 16, these being made fast in place in any suitable manner and fitting on each side of the backbone of such animal. The pads prevent the body 10 from moving from the proper place and the girth straps 13 and 14 maintain the holder permanently in place.

The fly paper 12, near opposite ends and at the longitudinal median, is provided with elongated slots 17 for accommodating holding pins 18 fitted in the body 10 at the longitudinal center thereof, the pins 18 being susceptible of play in the slots 17 in event of any contraction or expansion of the said body 10 and thereby avoiding the tearing or mutilating of the paper 12 when upon the holder.

Swingingly connected to the body 10 are clamping frames 19 and 20, respectively, these being swingingly supported by hinges 21 connecting them to the holder. The frame 20 carries the straps 22 provided with snap hooks or fasteners 23 for detachable engagement in perforated eyes 24 turned upwardly from the frame 19 and in this manner such frames 19 and 20 will be secured in clamping relation to the paper 12 for retention of the latter upon the holder 10, as will be clearly apparent from Figures 1 and 2 of the drawing.

The paper 12 can be replaced, as should be clearly apparent, as the same is readily removable from the holder. The frames 19 and 20 are substantially U-shaped, exposing the sticky composition contained upon the paper 12 for the catching of flies.

What is claimed is:

In a device of the kind described, a pair of spaced shoulder pads for an animal, a flexible body piece supporting the pads at one side thereof in their spaced relation to each other and having reversely tapered end, pins protruding from the face of the body opposite the pads, a fly paper having elongated slots receiving the pins when superimposed upon said body, hinged frames on said body and marginally embracing the ends of said paper, snap fasteners connecting the hinged frames together, and a girth strap connected with the tapered ends of said body.

THOMAS H. DRUMMOND.